United States Patent Office 3,625,656
Patented Dec. 7, 1971

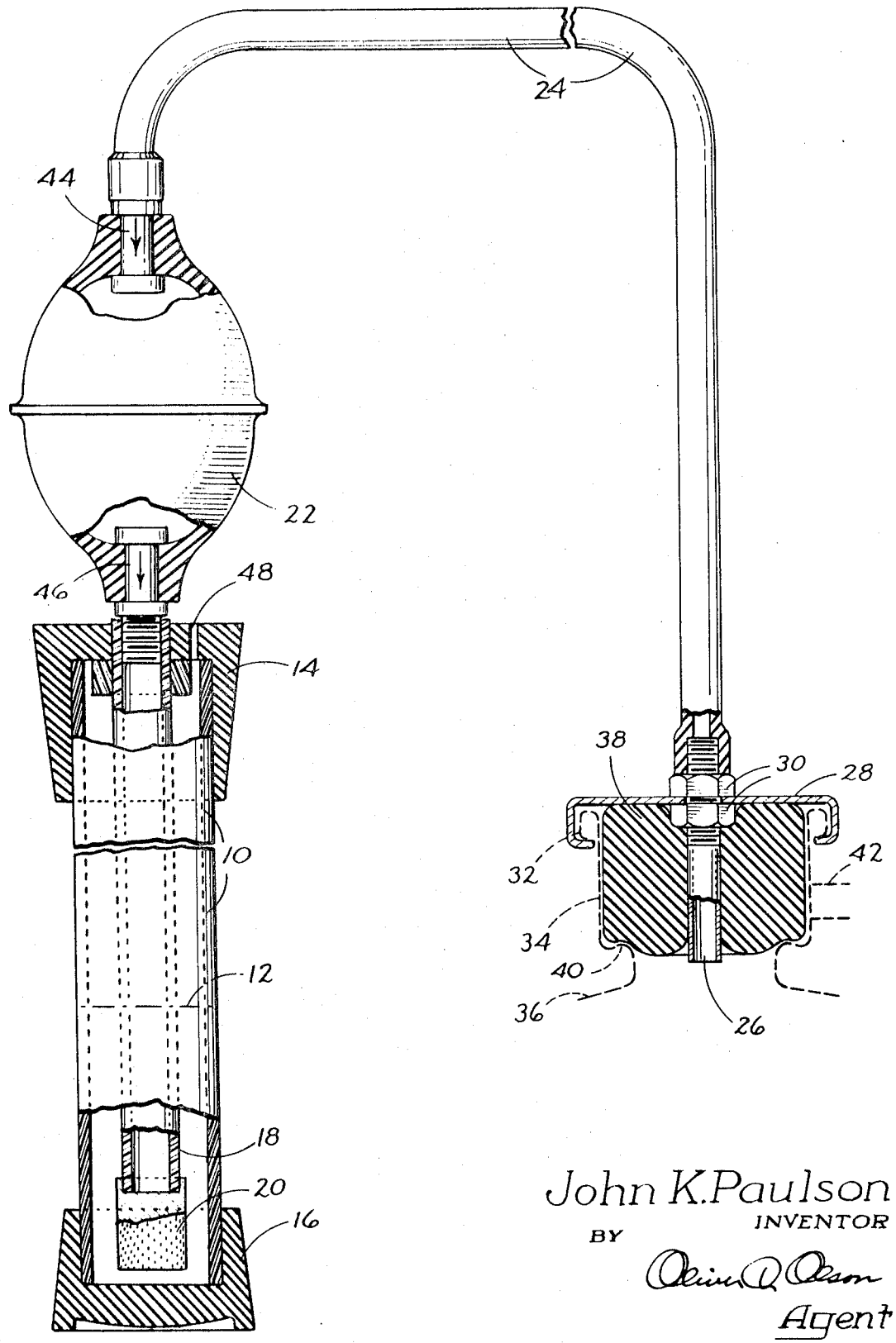

3,625,656
GAS LEAK DETECTOR FOR LIQUID-COOLED INTERNAL COMBUSTION ENGINES
John K. Paulson, 14930 SW. Uplands Drive, Lake Oswego, Oreg. 97034
Filed Mar. 28, 1969, Ser. No. 811,404
Int. Cl. G01m 3/20; G01n 31/22
U.S. Cl. 23—253 R
9 Claims

ABSTRACT OF THE DISCLOSURE

A passageway through a radiator cap communicates through an elongated tube and aspirator bulb with a delivery tube opening into a gas indicator fluid confined in a vented transparent container.

BACKGROUND OF THE INVENTION

This invention relates to gas leak detectors, and more particularly to a simplified detector for determining the presence of combustion gases in the liquid cooling system of internal combustion engines.

Combustion gases will appear in the liquid cooling system of an internal combustion engine if leakage occurs from the engine cylinders due to a crack in the cylinder block or head, or a defective cylinder head gasket. Such gases are detectable by devices of the type disclosed in the U.S. Pat. No. 2,888,331 wherein a sample of the air in the radiator reservoir is bubbled through a chemical solution which reacts with carbon dioxide and carbon monoxide to give a visible change in the appearance of the solution.

Such devices of the prior art are characterized by requiring an operator to hold the device in pressure contact with the radiator filler pipe. This requirement presents the hazard of injury to the operator by boiling water or steam in the event of overheating of the coolant. The hazard is magnified by the requirement that the operator's head must be placed quite close to the radiator filler pipe in order to view the change in appearance of the solution. The requirement also limits the degree of visibility available for viewing the indicator solution.

Such prior devices also are of complex and costly construction. They require manipulation of shut-off valves and plugs to prevent loss of indicator solution when not in use. They also involve assembly and disassembly of a considerable number of parts for cleaning, maintenance and repair.

SUMMARY OF THE INVENTION

In its basic concept the gas leak detector of the present invention provides for coupling the radiator filler inlet of the cooling system of an internal combustion engine to a remotely positioned gas indicator of extremely simplified construction.

It is by virtue of the foregoing basic concept that the primary objective of the present invention is achieved, namely to overcome the disadvantages of prior devices of the class described, as discussed hereinbefore.

Another important object of this invention is the provision of a gas leak detector of the class described in which the container for the indicator solution is movable by the operator to a wide variety of positions remote from the engine radiator, for obtaining the best lighting condition for viewing the indicator solution.

A further important object of the present invention is the provision of a gas leak detector of the class described which is constructed of a minimum number of parts capable of assembly and disassembly for cleaning with speed and facility.

The foregoing and other objects and advantages of this invention will appear from the following detailed description, taken in connection with the accompanying drawing of the preferred embodiment.

BRIEF DESCRIPTION OF THE DRAWING

The single figure of the drawing is a foreshortened vertical elevation of a gas leak detector embodying the features of the present invention, parts being broken away to disclose details of internal construction.

DESCRIPTION OF THE PREFERRED EMBODIMENT

The gas leak detector illustrated includes an elongated container 10 closed at both ends and adapted to contain a quantity of indicator solution to a prescribed level 12, as described hereinafter. For this purpose at least a portion of the container is made of transparent material in order to enable the viewing of the solution. In the preferred embodiment illustrated, the container is made of a length of transparent glass or synthetic plastic tubing, open at both ends. The open ends of the container are closed, preferably by removable resilient caps 14 and 16, respectively which frictionally engage the end portions of the container and provide a liquid tight seal. In the embodiment illustrated these end closures are provided by caps of rubber or resilient synthetic plastic provided with internal pockets frictionally receiving therein the opposite end portions of the length of tubing defining the container.

A wide variety of indicator solutions may be employed for the purpose of the present invention in detecting the presence of carbon dioxide and/or carbon monoxide. For example, the solution may contain an appropriate pH color indicator such as thymol blue, phenolphthalein and many others which provide a change in color of the solution when carbon dioxide or carbon monoxide is introduced into the solution. Other types of indicators, such as an aqueous solution of barium hydroxide and calcium hydroxide, provide visible indication of carbon dioxide or carbon monoxide by chemical reaction resulting in the formation of a precipitate which renders the solution cloudy. Accordingly, the type of indicator desired may be selected from a wide variety of indicators well known in the art.

A gas delivery conduit 18, preferably in the form of an open ended tube, extends through one of the end closures, for example closure 14, with its inner end opening into the indicator solution, so that gases from the radiator being tested are caused to bubble through the solution. In the preferred embodiment illustrated, this inner end of the delivery tube is provided with a porous cap 20 in order to reduce the gases to minute bubbles, whereby to enhance the efficiency of chemical reaction and change of appearance in the indicator solution.

The outer end of the delivery conduit 18 extends outward through the end closure for connection to the outlet end of a squeeze type aspirator bulb 22. The inlet end of the bulb is connected to one end of an elongated, flexible coupling conduit 24 the opposite end of which is connected to the outlet end of a gas pickup conduit 26.

The gas pickup conduit extends through a conventional radiator cap 28, and is secured thereto by such means as the locking nuts 30. The cap is of conventional construction and is adapted to be secured releasably in the locking flange 32 provided at the outer end of the filler pipe 34 which projects upwardly from the reservoir portion 36 of a conventional radiator associated with the cooling system of an internal combustion engine.

Underlying the cap 28 and surrounding the inner portion of the gas pickup conduit 26 is a sealing plug 38 of rubber or other resilient material. This plug is dimensioned to seat at its lower end against the annular pressure seat 40 formed in the filler pipe 34 below the lateral overflow pipe 42. The plug thus functions as a pressure seal in manner similar to the the conventional, spring loaded seal component of a conventional radiator cap. The plug is resiliently deformable so as to deflect upward from the seal 40 under the influence of a predetermined magnitude of superatmospheric pressure within the radiator, to communicate the latter with the overflow pipe 42 and thus effect pressure relief within the radiator. For this purpose it is preferred that the sealing plug 38 be made of highly resilient sponge rubber.

The inlet and outlet ends of the aspirator bulb are provided with one-way check valves 44 and 46, respectively, which function in well known manner to permit the flow of gases from the radiator through the coupling conduit 24 and aspirator bulb 22, into the delivery tube 18 and thence through the porous cap 20 into the indicator solution. The check valves prevent flow in the opposite direction, as will be understood.

Since the normal pressure within the cooling system of the engine may be sufficient to force gases from the radiator reservoir and through the delivery tube without assistance from the aspirator bulb, the latter may be omitted, if desired.

Means is provided for venting the interior of the container 10, above the level 12 of the indicator solution therein, to the atmosphere in order to relieve the pressure within the container as gases are delivered to it. To this end a relief valve is provided in the closure at the upper end of the container. There are many types of commercially available valves suitable for this purpose. The type employed must be closed at normal atmospheric pressure within the container and is caused to open when the pressure within the container reaches a predetermined magnitude above atmospheric. In the preferred embodiment illustrated, such a valve is provided in the resilient top end closure 14 simply by a slit 48 in the latter. Because of the resilience of the closure material, the slit normally remains closed. Thus, the container may be upended or laid on its side when not in use, without incurring loss of indicator fluid. However, as combustion gases are forced into the container, either by operation of the aspirator bulb, or by the normal pressure within the cooling system of the engine, the slit is caused to open when the pressure within the container reaches a predetermined magnitude.

The operation of the gas leak detector described hereinbefore is as follows: The conventional radiator cap is replaced by the radiator cap 28 connected to the delivery conduit 18 through the coupling conduit 24 and aspirator bulb 22. The engine then is put in operation to effect circulation of liquid coolant through the cooling system. The operator then may withdraw to the safety of a remote position, holding the container 10 in one hand while manipulating the aspirator bulb with the other hand, if aspiration is found necessary or desirable. Assuming the aspirator bulb is to be used, the operator first squeezes the bulb to force air contained therein through the outlet end, into the delivery conduit 18 and thence outward through the porous cap 20 into the indicator solution. Upon release of the bulb the latter is caused to expand, thereby drawing gases from the radiator reservoir 36 through the pickup conduit 26 and coupling conduit 24 into the inlet end of the bulb. Subsequent squeezing of the bulb forces these gases into the indicator solution, as previously explained.

The operator views the appearance of the indicator solution through the transparent portion of the container. In this regard provision of the elongated flexible coupling conduit 24 permits the operator to move the container assembly at will to achieve the best lighting condition for his observation. If the appearance of the solution does not change after a quantity of gases from the radiator reservoir has been bubbled through it, the operator is apprised of the fact that no leakage of combustion gases into the cooling system is occurring. On the other hand, if such leakage is occurring, carbon dioxide and/or carbon monoxide will collect in the radiator reservoir and will be conducted therefrom through the delivery tube into the indicator solution where the change in appearance, commensurate with the type of indicator employed, will be viewed by the operator.

To clean the container assembly it is necessary merely to remove the end caps 14 and 16 and wash the container tube 10, whereupon the caps may be reinstalled.

It will be apparent to those skilled in the art that various changes in the size, shape, number and arrangement of parts described hereinbefore may be made without departing from the spirit of this invention.

Having now described my invention and the manner in which it may be used, I claim:

1. A leak detector for determining leakage of combustion gases from a cylinder of an internal combustion engine into a liquid cooling system thereof, comprising
   (a) a container having at least a portion thereof of transparent material,
   (b) closure means closing opposite ends of the container,
   (c) a chemical solution in the container capable of changing appearance upon reaction with said combustion gases to indicate presence of the latter,
   (d) a delivery conduit in the container having its inner end immersed in the solution and its outer end extending from the container,
   (e) connector means separate from the container and delivery conduit and adapted for sealing engagement with a liquid inlet of the cooling system of said internal combustion engine,
   (f) gas pickup conduit means separate from the delivery conduit and extending through the connector means, and
   (g) an elongated flexible coupling conduit connected at one end to the outer end of the delivery conduit and at the opposite end to the outer end of the gas pickup conduit means.

2. The leak detector of claim 1 wherein the container comprises a length of transparent tubing open at both ends, and the closure means comprise resilient caps secured removably to the tubing at the opposite ends thereof.

3. The leak detector of claim 1 wherein the coupling conduit includes an aspirator bulb having valve means at its opposite ends operable to permit flow of gases only in the direction toward the delivery conduit.

4. The leak detector of claim 1 wherein the connector means comprises a radiator cap adapted to be secured to an engine cooling system filler pipe locking flange, and a resilient rubber seal member extending inward from the cap and adapted to seal against the pressure seat of the filler pipe, the seal member being deflectable from the seat under the influence of a predetermined superatmospheric pressure in the radiator to communicate the latter with the overflow opening in the filler pipe.

5. The leak detector of claim 1 wherein the closure means at the upper end of the container includes valve means which is closed under normal atmospheric pressure within the container and is capable of being opened when pressure in the container reaches a predetermined magnitude above normal atmospheric pressure.

6. The leak detector of claim 5 wherein the valve means comprises a resilient member having a self-closing slit therethrough.

7. A leak detector for determining leakage of combustion gases from a cylinder of an internal combustion engine into a liquid cooling system thereof, comprising
   (a) a container having top and bottom ends and having at least a portion thereof of transparent material,
   (b) closure means closing the top and bottom ends of the container, (c) a chemical solution in the container capable of changing appearance upon reaction with said combustion gases to indicate presence of the latter, (d) a delivery conduit extending downward through an supported by the top end closure means and having its inner end immersed in the solution and its outer end extending from the container, (e) connector means separate from the container and delivery conduit and adapted for sealing engagement with a liquid inlet of the cooling system of said internal combustion engine, (f) gas pickup conduit means separate from the delivery conduit and extending through the connector means, and (g) an elongated flexible coupling conduit connected at one end to the outer end of the delivery conduit and at the opposite end to the outer end of the gas pickup conduit means.

8. The leak detector of claim 7 whereupon the top end closure means includes valve means which is closed under normal atmospheric pressure within the container and is capable of being opened when pressure in the container reaches a predetermined magnitude above normal atmospheric pressure.

9. The leak detector of claim 7 wherein the coupling conduit includes an aspirator bulb having valve means at its opposite ends operable to permit flow of gases only in the direction toward the delivery conduit.

References Cited

UNITED STATES PATENTS

| | | | |
|---|---|---|---|
| 2,888,331 | 5/1959 | Carpenter | 23—253 |
| 3,127,246 | 3/1964 | Carroll | 23—253 |

MORRIS O. WOLK, Primary Examiner

R. M. REESE, Assistant Examiner

U.S. Cl. X.R.

23—23 OR, 254 R; 73—40